US006801376B2

(12) United States Patent
Smith

(10) Patent No.: US 6,801,376 B2
(45) Date of Patent: Oct. 5, 2004

(54) METHOD AND APPARATUS FOR EVALUATING A HEAD-DISK INTERFACE CONDITION FOR DISK DRIVES

(75) Inventor: Gordon James Smith, Rochester, MN (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 288 days.

(21) Appl. No.: 09/886,507

(22) Filed: Jun. 21, 2001

(65) Prior Publication Data

US 2003/0007268 A1 Jan. 9, 2003

(51) Int. Cl.[7] .............................................. G11B 27/36
(52) U.S. Cl. ........................... 360/31; 360/69; 360/75; 360/53
(58) Field of Search .............................. 360/46, 67, 51, 360/53, 65, 75, 31, 69; 324/212

(56) References Cited

U.S. PATENT DOCUMENTS

| | | | | |
|---|---|---|---|---|
| 3,753,254 A | * | 8/1973 | Ruble et al. ............. | 360/77.02 |
| 4,094,013 A | * | 6/1978 | Hill et al. ................ | 369/30.01 |
| 4,777,544 A | | 10/1988 | Brown et al. | |
| 5,410,439 A | | 4/1995 | Egbert et al. | |
| 5,527,110 A | | 6/1996 | Abraham et al. | |
| 5,559,460 A | * | 9/1996 | Cunningham ............. | 327/179 |
| 5,715,110 A | * | 2/1998 | Nishiyama et al. ......... | 360/67 |
| 5,818,656 A | * | 10/1998 | Klaassen et al. ........... | 360/67 |
| 5,838,514 A | * | 11/1998 | Smith et al. .............. | 360/75 |
| 5,991,113 A | | 11/1999 | Meyer et al. | |
| 6,018,428 A | * | 1/2000 | Okamura ................. | 360/25 |
| 6,038,091 A | * | 3/2000 | Reed et al. ............... | 360/46 |
| 6,049,763 A | * | 4/2000 | Christiansen et al. ....... | 360/46 |
| 6,100,683 A | * | 8/2000 | Lim et al. ................ | 360/31 |
| 6,104,557 A | * | 8/2000 | Kasai et al. .............. | 360/46 |
| 6,239,936 B1 | * | 5/2001 | Abraham et al. .......... | 360/75 |
| 6,359,743 B1 | * | 3/2002 | Patti et al. ............... | 360/25 |
| 6,446,236 B1 | * | 9/2002 | McEwen et al. ........... | 360/53 |
| 6,483,657 B1 | * | 11/2002 | Fioravanti et al. ......... | 360/75 |
| 6,494,085 B2 | * | 12/2002 | Wakefield et al. .......... | 73/105 |

OTHER PUBLICATIONS

IBM, "Integrated Read Preamplifier and Crash Detector for Disk Life," IBM Technical Disclosure Bulletin, vol. 12, No. 12, May 1970.

IBM, S.Z. Dushkes and R. J. Surty, "Head Crash Detector," IBM Technical Disclosure Bulletin, vol. 13, No. 12, May 1971.

IBM, "Generalized Head/Disk Contact Detection Using Head Readback Signal," IBM Technical Disclosure Bulletin, vol. 34, No. 8, Jan. 1992, pp. 307–308.

* cited by examiner

Primary Examiner—David Hudspeth
Assistant Examiner—Glenda P. Rodriguez
(74) Attorney, Agent, or Firm—Zilka-Kotab, PC; Dominic M. Kotab

(57) ABSTRACT

A method of evaluating a condition of a head-disk interface (HDI) of an operational disk drive. The disk drive includes at least one disk having a disk surface and at least one transducer head for writing and/or reading data from the disk surface. In this regard, the transducer head is sensitive to temperature changes. With this in mind, the method includes rotating the disk at an operational rate. A first thermal signal is received from the transducer head that is indicative of thermal activity at the transducer head. The first thermal signal is analyzed for thermal transients. Based upon this analysis, first thermal variation information indicative of a relationship of thermal transients in the first thermal signal relative to a baseline is generated. Finally, the first thermal variation information is compared to threshold information indicative of an acceptable HDI. In one preferred embodiment, a prediction of an impending head crash is made based upon the comparison. Regardless, the method of the present invention does not attempt to calculate a fly height. Instead, the method essentially monitors thermal activity, and in particular thermal transients, at the transducer head. The thermal transient information is directly related to the health of the HDI and is therefore a better head crash predictor than existing methodologies.

20 Claims, 4 Drawing Sheets

METHOD AND APPARATUS FOR EVALUATING A HEAD-DISK INTERFACE CONDITION FOR DISK DRIVES

THE FIELD OF THE INVENTION

The present invention relates to disk drives. More particularly, it relates to a method and apparatus for an in-situ head-disk interface evaluation based upon transient MR head heat flux detection.

BACKGROUND OF THE INVENTION

A magnetic disk drive apparatus is an apparatus for recording and reading data on the surfaces of spinning disks through the use of a changing magnetic field. One or more data storage disks are coaxially mounted on a hub of a spindle motor. The spindle motor rotates the disks at speeds typically on the order of several thousand to tens of thousands of revolutions-per-minute. Digital information, representing various types of data, is typically written to and read from the data storage disks by one or more transducers, or read/write heads, which are mounted to an actuator assembly and hover above the surface of the rapidly rotating disks.

The transducer head is typically in the form of a magnetoresistive (MR) read element and/or an inductive write element carried on a slider body. Oftentimes, the slider and transducer are referred to in combination as a "head". Regardless, writing data to a disk generally involves passing a current through the write element of the transducer to produce magnetic lines of flux that magnetize a specific location of the disk surface. Reading data from a specified disk location is typically accomplished by the read element sensing the magnetic field or flux lines emanating from the magnetized locations of the disk. As the read element passes over the rotating disk surface, interaction between the read element and the magnetized locations on the disk surface results in the production of electrical signals, commonly referred to as readback signals, in the read element.

The slider is typically mounted to a flexible suspension portion of an arm assembly that is otherwise part of the actuator assembly. Further, the slider normally incorporates a rail or pad design that facilitates formation of an air bearing upon rotation of the disk. More particularly, as the disk rotates, an air bearing develops between the slider and the disk surface, causing the slider, and thus the read/write head, to lift and fly several microinches above the disk surface. The distance between the slider and the disk surface is oftentimes referred to as a "fly height". In magnetic recording technology, it is desired to "fly" the slider as closely as possible to the disk surface (i.e., minimal fly height) so that the read transducer can distinguish between the magnetic fields emanating from closely spaced regions on the disk. The combination of the head and the disk surface is commonly referred to as the head-disk interface (HDI).

Disk drive manufacturers are continually searching for improved methods of performing in-situ HDI evaluations (i.e., in an operational disk drive following final assembly). As the HDI deteriorates, the opportunity for unexpected contact between the transducer head and the disk surface (or "head crash") increases significantly. Obviously, a head crash is highly undesirable as it results in loss of data, damage to the disk, damage to the transducer head, etc. To this end, accepted techniques have revolved around attempting to determine the actual operational fly height, and then evaluating whether the fly height is below an acceptable level. Unfortunately, available fly height measuring systems are relatively expensive to implement, time consuming, and imprecise, especially for operational disk drives. With respect to MR-transducer heads, efforts have been made to convert the magnetic signal induced in the MR transducer to a spacing signal that varies as a function of head-to-disk spacing changes. Again, however, these techniques are relatively time consuming, may require a specially formatted track on the disk, etc. These deficiencies are further exacerbated with recently available glass-based disks. With glass disks, the operational fly height is much less than the fly height associated with aluminum-based disks due to the highly planar disk surface afforded by glass. As a result, the uncertainty associated with any one particular fly height measurement technique increases dramatically, necessitating further, and thus costly, measurement technique improvements.

Operational disk drive HDI evaluation continues to be highly important. However, existing techniques based upon monitoring changes in fly height are not cost effective and do not produce consistent results, especially with glass-based disks. Therefore, a need exists for an inexpensive method and apparatus for evaluating, in-situ, operational disk drive HDI based upon available signal information.

SUMMARY OF THE INVENTION

One aspect of the present invention relates to a method of evaluating a condition of a head-disk interface (HDI) of an operational disk drive. The disk drive includes at least one disk having a disk surface and at least one MR transducer head for reading data from the disk surface. In this regard, the MR transducer head is sensitive to temperature changes. With this in mind, the method includes rotating the disk at an operational rate. A first thermal signal is received from the MR transducer head that is indicative of temperature at the transducer head. The first thermal signal is analyzed for thermal transients. Based upon this analysis, first thermal variation information indicative of a relationship of thermal transients in the first thermal signal relative to a baseline is generated. Finally, the first thermal variation information is compared to threshold information indicative of an acceptable HDI. In one preferred embodiment, a prediction of an impending head crash is made based upon the comparison. Regardless, the method of the present invention does not attempt to calculate a fly height. Instead, the method essentially monitors thermal activity, and in particular thermal transients, at the transducer head. As described herein, this thermal transient information is directly related to the health of the HDI, and is therefore a better head crash predictor than existing methodologies.

Another aspect of the present invention relates to a disk drive including at least one disk, at least one transducer head, a spindle motor, an actuator assembly, and a programmable controller. The disk has a disk surface. The MR transducer head is provided for reading data from the disk surface. In this regard, the transducer head is temperature sensitive and generates a readback signal, a component of which is indicative of temperature at the transducer head. The spindle motor is coupled to the disk for rotating the disk. The actuator assembly is coupled to the transducer head for positioning the transducer head over the disk surface. Finally, the programmable controller is configured to evaluate an interface between the transducer head and the disk surface (HDI). In this regard, the programmable controller is capable of receiving the readback signal from the transducer head and delineating a thermal component signal therefrom. The programmable controller is further capable of analyzing the thermal component signal for thermal transients and generating thermal variation information indicative of a relationship of the thermal transients relative to a baseline. Finally, the programmable controller is capable of comparing the thermal variation information to threshold information that is otherwise indicative of an acceptable HDI, and then evaluating a current status of the HDI based upon this comparison. In one preferred embodiment, the disk is glass-based, and the programmable controller is capable of evaluating the HDI at any radial position of the transducer head relative to the disk surface.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
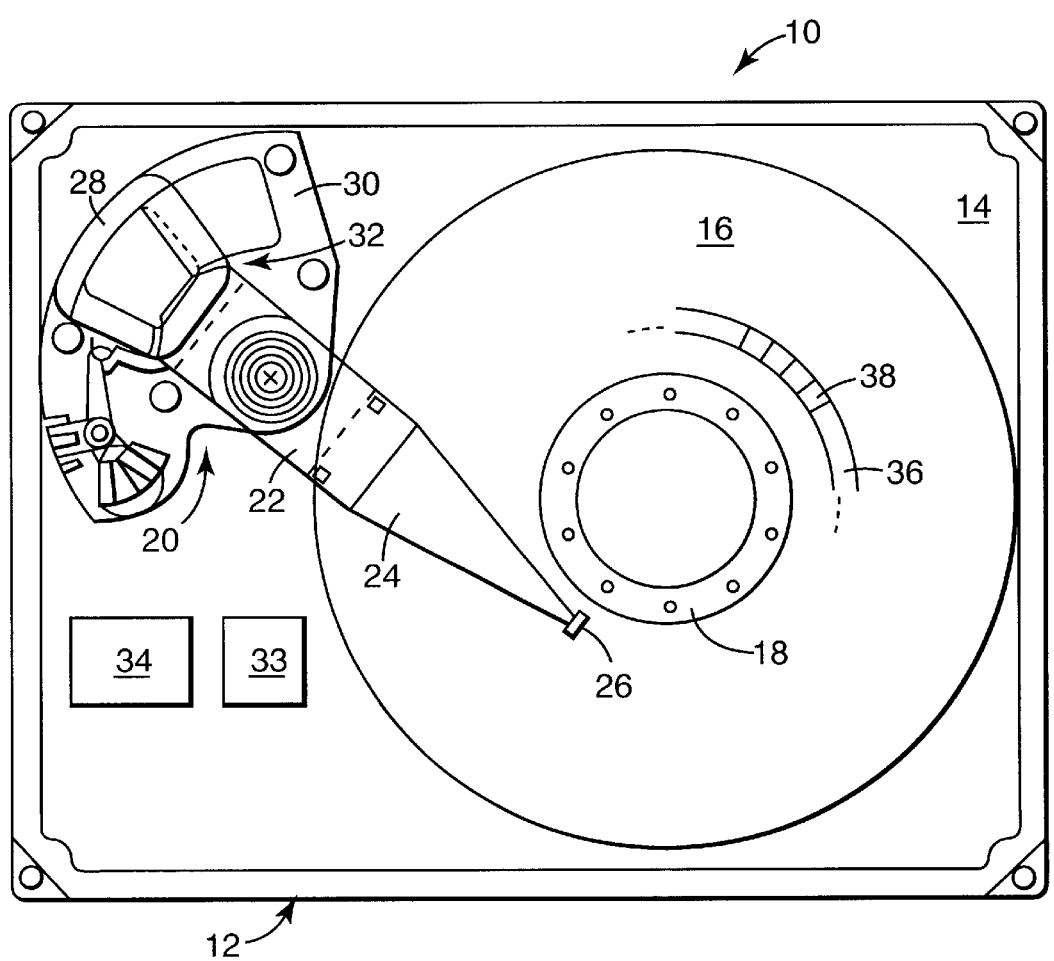
FIG. 1 is a top view of an exemplary disk drive in accordance with the present invention with its upper housing cover removed and portions shown in block form.

An exemplary disk drive system 10 is provided in FIG. 1. As a point of reference, the disk drive 10 includes a housing 12 defined by a cover (not shown) and a base 14. For ease of illustration, the cover has been removed from the view of FIG. 1. As a further point of reference, the disk drive 10 is shown by way of example and not of limitation. Many different types of disk drive data storage devices or systems can benefit from the present invention.

With the above in mind, the disk drive 10 typically includes one or more magnetic data storage disks 16 that rotate about a spindle motor 18. The disks 16 are preferably aluminum-based. However, the presentation is equally applicable to virtually any type of disk, including glass-based, ceramic-based, plastic-based, etc. An actuator assembly 20 typically includes a plurality of interleaved actuator arms 22, with each arm 22 having one or more suspensions 24 each maintaining a head or slider 26. The slider 26 is described in greater detail below, but generally includes a read head, such as an MR read element, and a write head, such as an inductive write element. Regardless, the actuator assembly 20 further includes a coil assembly 28 which cooperates with a permanent magnet structure 30 to operate as an actuator voice coil motor (VCM) 32 responsive to control signals produced by a programmable controller 34.

The programmable controller 34 preferably includes control circuitry that coordinates the transfer of data to and from the data storage disks 16, and cooperates with the VCM 32 to move the actuator arms 22, suspensions 24, and sliders 26 to prescribed track 36 and sector 38 locations when reading and writing data to and from the disks 16.

Figure 2A:
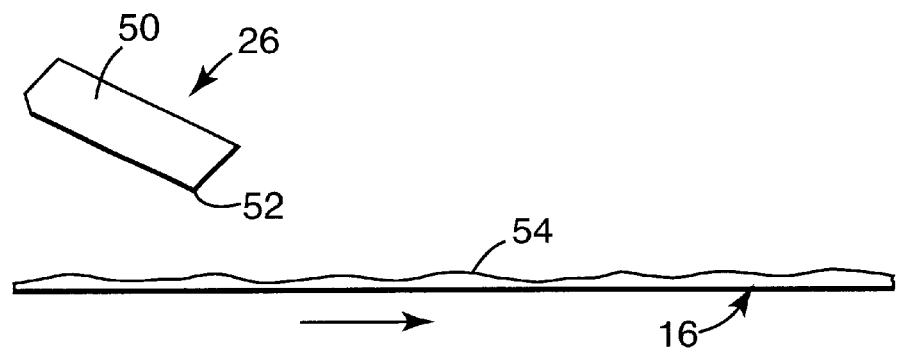
FIG. 2A is an exaggerated view showing a transducer head passing over a portion of a disk surface at a first fly height.

In addition, the programmable controller 34 is configured to evaluate the interface between the transducer head and associated disk (i.e., head-disk interface or HDI) during operation of the disk drive 10. Alternatively, an additional programmable controller can be provided for performing HDI evaluation. As described in greater detail below, the HDI evaluation is based upon an examination of thermal activity at the transducer head. For example, FIG. 2A provides an exaggerated, diagrammatic view of the slider 26 relative to a corresponding disk 16 during operation of the disk drive 10 (FIG. 1). In general terms, the slider 26 includes a support body 50 maintaining a transducer head 52 (greatly exaggerated in FIG. 2A) comprised of at least one temperature sensitive element. For example, the transducer head 52 can include an MR read head, that, as known in the art, is sensitive to temperature changes. As the disk 16 rotates (represented by an arrow in FIG. 2A), an air bearing is created between the slider 26 and an outer surface 54 of the disk 16. This air bearing results in a "fly height" between the transducer head 52 and the outer surface 54. As is known in the art, the transducer head 52 senses the magnetic field or flux lines emanating from magnetized locations of the disk surface 54. The output of transducer head 52 is processed by an arm-electronics module 33 which includes a preamplifier and high-pass filter. This information is provided to the programmable controller 34 in the form of a readback signal. The readback signal is actually a composite signal comprising independent magnetic and thermal signal components. More particularly, low frequency modulation in the readback signal is, in actuality, an independent thermal information signal component of the readback signal. While the magnetic signal component provides the desired data from the disk 16, the thermal signal component can be extracted and utilized for evaluating HDI as described below.

Figure 2B:
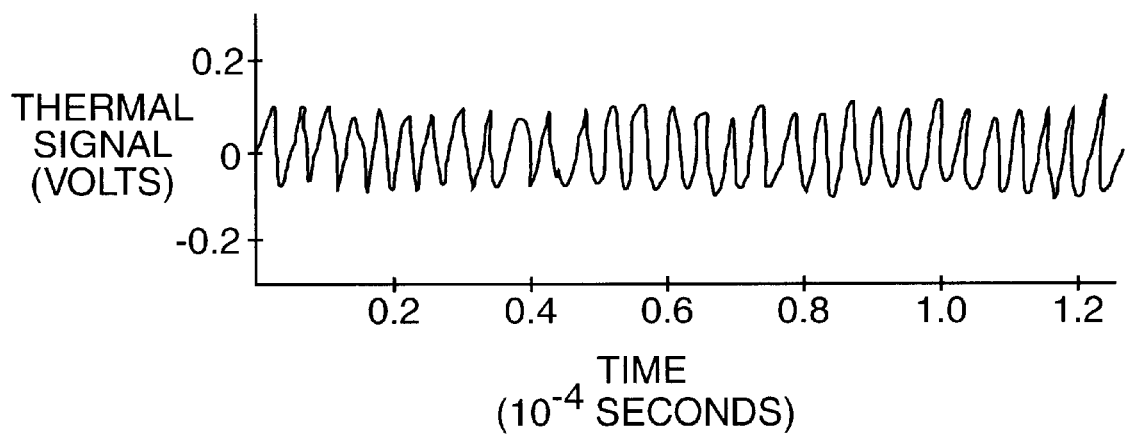
FIG. 2B is a thermal signal component of a readback signal generated by the transducer head of FIG. 2A.

Because the thermal signal component has a much lower frequency as compared to the magnetic signal component, extraction of the thermal signal component from the readback signal is well known. For example, U.S. Pat. No. 5,838,514, the teachings of which are incorporated herein by reference, describes an acceptable technique for delineating the thermal signal component. With this in mind, FIG. 2B graphically illustrates an exemplary thermal signal generated by the transducer head 52 of FIG. 2A in terms of a thermal response voltage. Modulations in the thermal signal of FIG. 2B are indicative of temperature of the transducer head 52. As a further point of reference an MR element, otherwise commonly used as the read element for the transducer head 52, is essentially a resistor subjected to a constant bias current. This current generates heat. Due to the minute spacing between the transducer head 52 and the disk 16, the heat generated at the transducer head 52 is transferred to the disk surface 54. The head transfer is an inverse function of the head-to-disk spacing. If the spacing between the disk surface 54 and the transducer head 52 is decreased, more heat is transferred, effectively cooling the transducer head 52. Conversely, an increase in the head-to-disk spacing reduces the heat transfer, thereby increasing the temperature and resistance of the transducer head 52. Because it is impossible to render the disk surface 54 precisely planar and maintain the transducer head 52 at a consistent, precise fly height, the heat transfer will always vary, as reflected by the modulations in the thermal signal of FIG. 2B (expressed in terms of voltage).

Figure 3A:
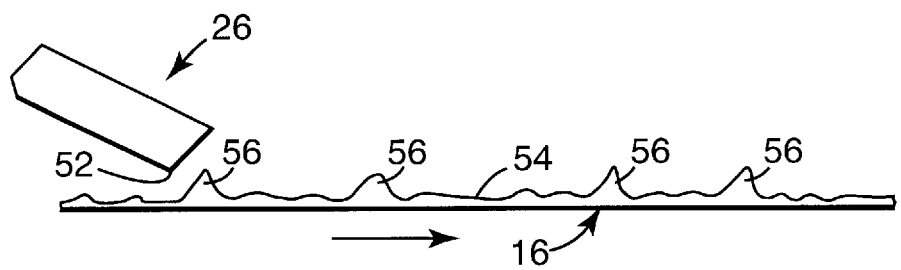
FIG. 3A is an exaggerated view showing a transducer head passing over a portion of the disk surface at a second fly height.
Figure 3B:
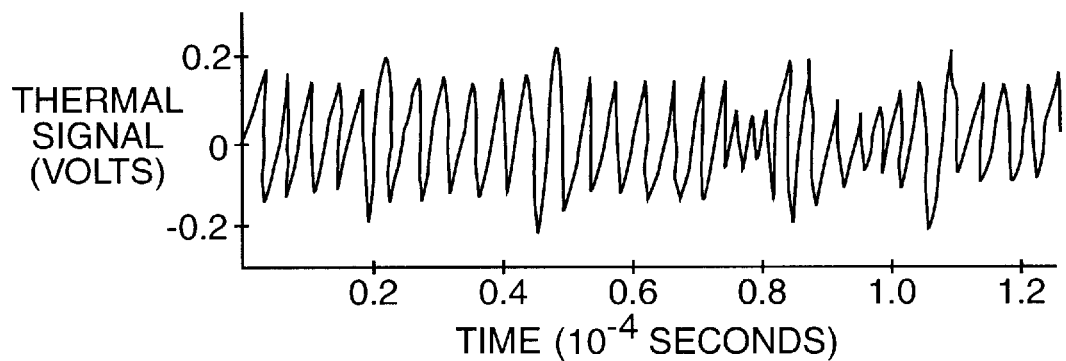
FIG. 3B is a thermal component signal of a readback signal generated by the transducer head of FIG. 3A.
Figure 3C:
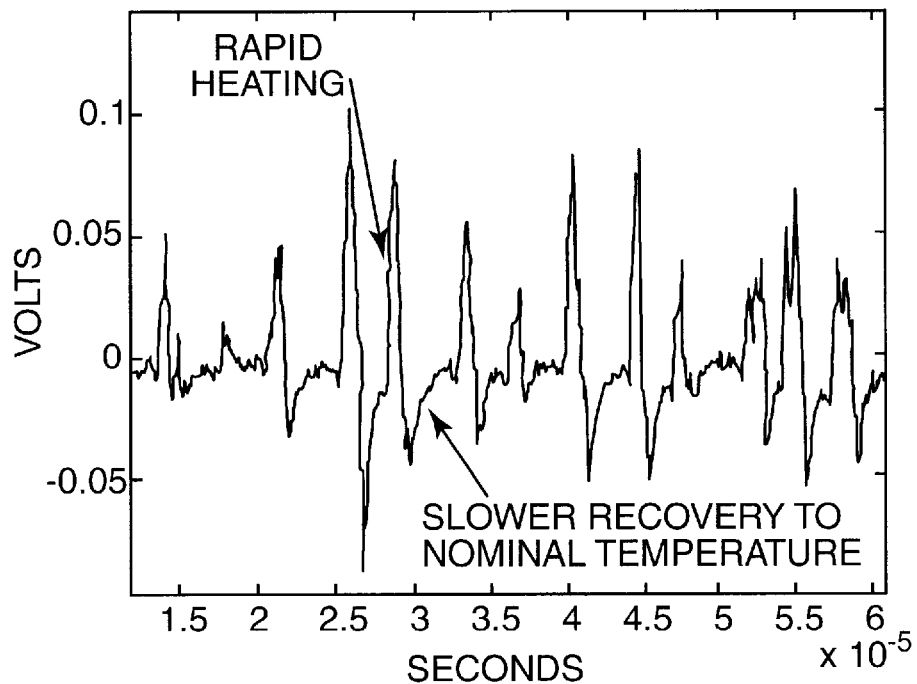
FIG. 3C is a portion of the signal of FIG. 3B after high-pass filtering by the arm electrode module.

The HDI illustrated in FIG. 2A, along with the related thermal signal of FIG. 2B, reflects an acceptable, "healthy"

situation. That is to say, the transducer head 52 is flying at an acceptable fly height over the disk surface 54, and the disk surface 54 is relatively free of asperities (i.e., unexpected protrusions from the disk surface 54). Over time, however, the HDI may begin to deteriorate, for example due to unavoidable wear on the disk surface and air bearing surface of the slider 26 that reduces the fly height, presence of asperities on the disk surface 54, etc. This occurrence is reflected in FIG. 3A in which the transducer head 52 is positioned at a lesser fly height as compared to FIG. 2A and the disk surface 54 includes several asperities (referenced generally as 56). An exemplary thermal signal associated with the transducer head 52 in the position of FIG. 3A is graphically illustrated in FIG. 3B. Because the transducer head 52 is now much closer to the disk surface 54, the heating and cooling of the transducer head 52 is more exaggerated, producing relatively larger modulations in the thermal signal. Relative to a baseline of the thermal signal, these more dramatic variations can be designated as thermal transients, and are indicative of deterioration of the HDI. A further point taken from the thermal signal of FIG. 3B is the effect of the asperities 56. In particular, the transducer head 52 physically contacts the asperities 56. It has been found that just prior to hitting the asperity 56, the transducer head 52 more rapidly cools (i.e., the heat flux from the transducer head 52 increases due to the reduced distance between head and disk surfaces). Subsequent contact between the transducer head 52 and the asperity 56 generates mechanical frictional heating of the transducer head 52, and thus a relatively large "spike" in the thermal signal. To better illustrate the variations of thermal signal or increased amplitude of the thermal transients, a portion of the exemplary thermal signal of FIG. 3B is shown in greater detail in FIG. 3C. The signal is shown differentiated which is the result of high-pass filtering in the arm-electrode module. As is typical with intermittent contact between the transducer head 52 and the disk surface 54, each thermal event is a rapid heating (caused by frictional contact) followed by a slower recovery to nominal temperature. Because of the large number of adjacent contacts, however, there is a superposition of these events. Notably, even without direct contact, the reduced distance between a head and asperities will cause cooling which results in negative spike.

The thermal signal associated with a temperature-sensitive transducer head, such as a MR read head, has previously been used to estimate fly height. As previously described, this methodology is subject to discrepancies, for example due to expected dynamic variation in the fly height, and is relatively expensive to implement. The system and method of the present invention does not attempt to measure fly height. Instead, the present invention is premised on a previously unrecognized increase in thermal transients, in terms of both quantity and magnitude, as the HDI deteriorates. More particularly, the system and method of the present invention uniquely evaluates HDI by quantifying the presence of thermal transients in a thermal signal, and then compares this information against threshold information. Based upon this comparison, a determination can be made as to whether the HDI has diminished to the point that a head crash failure is imminent.

Figure 4:
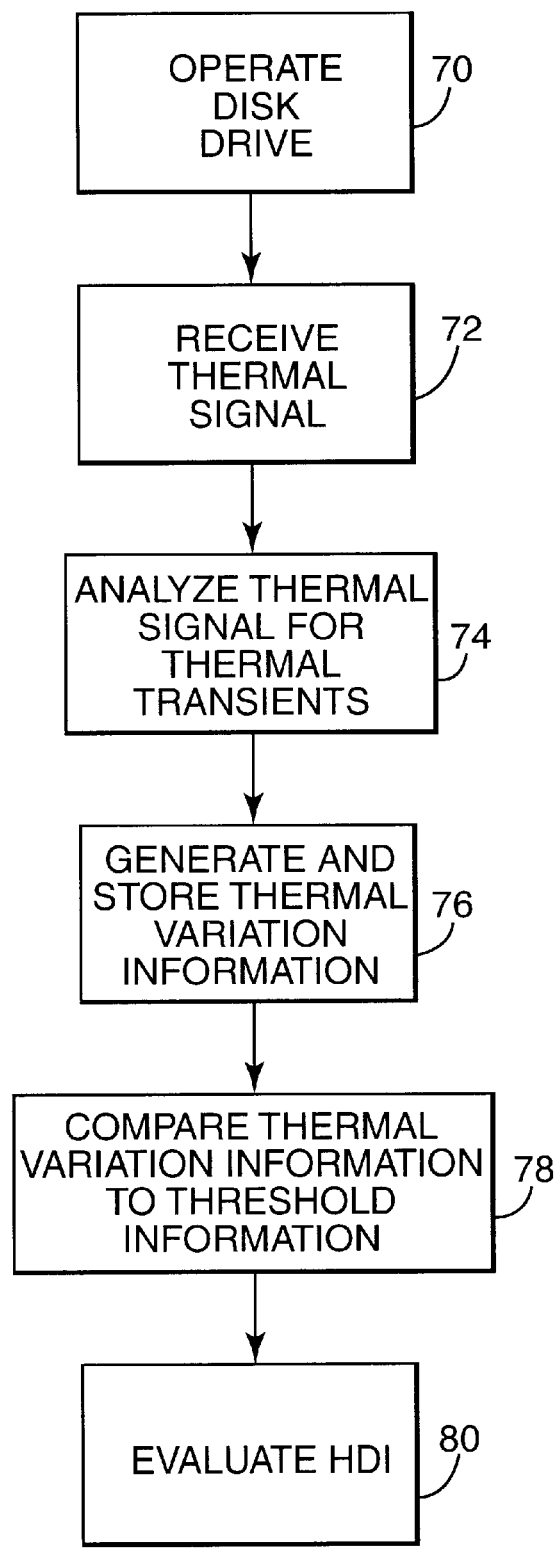
FIG. 4 is a flow diagram illustrating a preferred method of the present invention.

One preferred method in accordance with the present invention is illustrated by the flow diagram of FIG. 4. At step 70, the disk drive 10 is operated under normal operational conditions (e.g., normal disk speed and internal pressure). At step 72, the programmable controller 34 receives a thermal signal from the transducer head 52. Once again, in one preferred embodiment, the transducer head 52 includes an MR read element that is inherently temperature sensitive. With this well-known configuration, the MR read head provides a readback signal that includes an easily identifiable thermal component signal. For example, the thermal component signal occurs at a frequency significantly lower than the magnetic data transition or component of the readback signal, and can thus be readily extracted from the readback signal as previously described. Alternatively, the transducer head 52 can be configured to provide a thermal signal apart from the readback signal.

The thermal component signal is preferably filtered to remove extraneous events and reveal a baseline signal. The baseline signal represents the temperature of the transducer head 52. To provide a reliable indicator of thermal activity, the baseline signal is preferably determined from thermal signal information over an entire track (or "cylinder") 36. While feasible, the total thermal activity data associated with an entire track 36 is quite sizable. To reduce the amount of data stored by the programmable controller 34, in one preferred embodiment, the thermal baseline signal for an entire track 36 is extracted by using a sliding window sampling technique. The sliding window preferably has a minimum length equal to the sampling rate of the readback signal, $f_s$, divided by the lowest frequency in the readback, $f_L$. In other words, if M is the number of samples in a window, then M is greater than $f_s/f_L$. The occurrence of thermal transients relative to a baseline signal can be based on a sliding accumulator of all readback samples in a window that is "slid" through one or more physical sectors 38 of the track 36. At each position of the window, the samples are summed. This amounts to an average amplitude multiplied by the number of samples. If the number of samples in each window position throughout the sectors is the same, then the scaling is of no consequence. In this way, the thermal transient activity can be captured for an entire track 36. This analysis of a thermal signal for thermal transients occurs at step 74.

The thermal signal can be extracted by taking the average value for a number of samples of the readback signal. In general, if the readback signal is digitally sampled at a sampling rate $f_s$, and the lowest frequency in the readback signal is $f_L$, then the number of readback signal samples in a window, M, must be greater than $f_s/f_L$. For example, if $f_s=500\times10^6$Hz and $f_L=10\times10^6$ Hz, then M>50. The thermal signal for the $K^{Th}$ window in a sequence of windows is given by:

$$TH(K) = \frac{1}{M}\sum_{i=(K-1)M+1}^{KM} RB(i)$$

Where:

TH = thermal signal;

K = window number, ranging from 1, 2, 3, ..., $\frac{N}{M}$;

RB = sample of readback signal;

M = number of samples in each window.

For the $h^{Th}$ head, the thermal signal (TH) can then be determined as:

$$TH(h, K) = \frac{1}{M}\sum_{i=(K-1)M+1}^{KM} RB(h, i)$$

h=head number;

N=total number of readback signal samples, for example, N can be the total number of readback samples on one track.

Notably, while the thermal signal has been described as being received from a dedicated cylinder or track on the disk 16, the thermal signal can be generated from anywhere on the disk surface 54.

The length of time over which the thermal signal is received at step 72 and then analyzed at step 74, and thus the impact on a user of the disk drive 10, is preferably minimized. One way to accomplish this is to multiplex the measurements in time. To this end, rather than store all features of the thermal signal for subsequent comparison, the thermal signal can instead be processed dynamically in order to extract statistics indicative of thermal transient activity. Thus, for a single transducer head, an entire track can be analyzed as described above, by an array of windows for each sector (or sampling of sectors). The HDI evaluation can then be based on the lack of central tendency in the samples, and can be estimated by calculating the statistical variance of the samples. This statistical variance can then be stored by the process controller 34 as thermal variation information at step 76. Of course, a wide variety of other techniques can be used to evaluate the thermal transients occurring in the thermal signal to otherwise characterize the samples. As such, the actual thermal variation information stored by the programmable controller 34 can also vary.

An additional preferred feature of the method of the present invention is the filtering or removal of extraneous factors from the analysis of the thermal signal, such as a noisy head or channel. In one preferred methodology, spatial averaging of the thermal transients is employed. As a point of reference, the thermal transients are caused by local heating and cooling, and are therefore approximately stationary in a spatial sense. Conversely, head and media (or disk 16) noise are not spatially stationary, and can be eliminated through an ensemble averaging process. Once again, the goal of the thermal signal analysis is to sufficiently quantify the lack of central tendency or statistical variance in the thermal signal, with this variance or lack of central tendency being indicative of the number and/or magnitude of thermal transients. With this in mind, the thermal transient variation for a particular head (TTV(h)) can be first determined by averaging the thermal transient signal information for that head for a certain number of windows (K) and disk revolutions (R) by first calculating the thermal transient ensemble average (TTEA) according to the following equation:

$$TTEA(h, K) = \frac{1}{R}\sum_{j=1}^{R} TH(h, K, j)$$

Where:
TTEA=thermal transient ensemble average;
h=head number;
K=window number;
R=total number of disk revolutions;
TH=thermal signal;
j=revolution number.

With the thermal transient ensemble average (TTEA) in hand, the thermal transient variation for the $h^{Th}$ head can then be calculated as follows:

$$TTV(h)\frac{M}{N}\sum_{j=1}^{N/M}(TH(h, j) - TTEA(h, j))^2$$

Where:
TTV(h)=thermal transient variation for head h;
N=total number of readback samples;
M=number of samples in each window;
TH=thermal signal;
TTEA=thermal transient ensemble average.

Of course, it is recognized that the disk drive 10 may include a number of separate transducer heads 52. With this in mind, rather than store individual thermal transient variation information for each of the heads, the system and method of the present invention preferably stores and/or tracks information for only those heads most exhibiting HDI deterioration. In this regard, it is recognized that in the early stages of a head crash, typically only one head is ultimately responsible. Effectively, this head is the weak link that will crash, and then propagate to the other heads. With this in mind, the thermal variation information stored by the programmable controller 34 can be a reflection of the head which has exhibited a thermal transient variance that is significantly different from the other heads in the same drive via a statistical test for outliers. Basically, the focus is upon detecting one or possibly two heads in a drive that have a significantly different thermal baseline signal variance, and then designating that as the thermal transient variance information (TTV(h)) for the disk drive 10. This outliers statistic (?) can be calculated as follows:

$$? = \max(\max(TTV) - \operatorname{mean}(TTV), \operatorname{mean}(TTV) - \min(TTV))/\operatorname{variance}(TTV)$$

Pursuant to the above equation, the mean thermal transient variance number is calculated for each head and the maximum (max) and minimum (min) values are identified. The absolute difference between the minimum and the mean, and the difference between the maximum and the mean, are calculated. The larger of these two values is then divided by the determined statistical thermal transient variation variance, resulting in the outliers statistic (?).

To demonstrate the effectiveness of the outliers statistical analysis described above, data was generated for a 10-head disk drive. More particularly, a test drive having a single head exhibiting an otherwise acceptable or healthy HDI was analyzed as previously described (e.g., thermal signals received and analyzed pursuant the above equations over a single track). This thermal signal analysis was replicated nine times, each time with a different amount of simulated additive noise (approximately 5db noise added with each test). Finally, a vacuum was applied to the test drive, reducing the internal pressure from 1 Atm to approximately 0.13 Atm. As a point of reference, this reduction in ambient pressure causes the transducer head to fly much closer to the disk surface (i.e., reduction in fly height) and is thus reflective of a deteriorating or bad HDI. The thermal transient variance was calculated for each test head, and the outlier statistic ? was derived as previously described. The results for a simulated 10-head drive with all good heads and another with either one or two bad heads is shown in Table 1 below. With a factor of at least 200 difference between a normal drive a disk drive with an intending HDI failure to go on exhibits that the methodology is quite robust.

TABLE 1

| Normal Drive | One low-flying head | Two low-flying heads |
| --- | --- | --- |
| ? = 0.02 | ? = 4 | ? = 4.2 |

The above described methodology for generating the thermal variation information of step 76 is but one example of an accepted technique. A wide variety of other statistical evaluations and/or analyses are also acceptable for quantifying the magnitude and/or number of thermal transients existing in the thermal signal. For example, the amplitude of the largest thermal transient relative to the baseline value can be stored as the thermal variation information. Additionally, the number of thermal transients having an amplitude exceeding a predetermined value can be stored as the thermal variation information. Also, the thermal transient information can be a simple estimation of the standard deviation in the thermal signal, and be can expressed in a variety of terms, for example voltage. Simply stated, the thermal variation information represents an estimate of the variance in the thermal signal relative to the baseline value. Even further, the thermal transient evaluation can be made over a pre-selected time period, as opposed to a single track (or revolution) of the disk 16, and other available determinations devices, such as fuzzy logic, etc., are equally acceptable.

With the thermal variation information in hand, a comparison is made to threshold information at step 78. This threshold information is indicative of an acceptable HDI. In one preferred embodiment, the threshold information is generated during manufacture of the disk drive 10, and is stored in a memory of the programmable controller 34. Alternatively, thermal transient variance information can be initially determined and then stored as the threshold information. At a later point in time, for example one hour later, one day later, etc., the thermal transient variance is again estimated and compared against the previous analysis to evaluate HDI. The initial thermal transient variation information can continue to serve as the threshold information, or the most recent thermal transient variation information can be stored as the threshold information if the disk drive is not degrading in HDI. Along these same lines, a series of estimated thermal transient variation information can be stored and tracked. Regardless, based upon the comparison of the thermal variation information with the threshold information, the HDI can be evaluated at step 80.

The HDI evaluation at step 80 reflects the difference between the thermal variation information and the threshold information. For example, where the comparison reveals that the most recent thermal variation information exceeds the threshold information by a predetermined amount, a prediction can be made that the HDI is approaching impending head crash failure. Thus, where the comparison shows that the standard deviation in the most recent thermal variation information is 30% greater than the threshold information, the programmable controller 34 predicts the onset of an impending HDI failure, and prompts corrective action (e.g., increase the fly height, warn the user, etc.). A wide variety of other standards for prompting corrective action are equally applicable including, for example, a lesser or greater percent change (e.g., 20%) establishing the threshold information as an absolute limit, etc.

The system and method of the present invention provides a marked improvement over previous designs. The thermal signal component of a temperature sensitive transducer head is evaluated for thermal transient variance. The thermal component signal is readily available, and requires only minimal processing capabilities. Further, because the data generated during any one particular thermal transient variance evaluation need not be stored, only minimal processor memory space is required. Additionally, the statistical variance analysis can be relatively simplistic, yet still produce highly viable results. The actual fly height need not be calculated. Instead, the statistical variation is used as an absolute parameter, and can be easily be calculated. Finally, the system and method of the present invention can quickly predict the onset of an impending HDI head crash failure, a result not otherwise available with current methodologies.

Although the present invention has been described with reference to preferred embodiments, workers skilled in the art will recognize that changes can be made in form and detail without departing from the spirit and scope of the present invention.

What is claimed is:

1. A method of evaluating a condition of a head-disk interface (HDI) of an operational disk drive including at least one disk having a disk surface and at least one transducer head for writing and/or reading data from the disk surface, the transducer being sensitive to temperature, the method comprising:
   rotating the disk at an operational rate;
   receiving a first thermal signal from the transducer head indicative of thermal activity;
   analyzing the first thermal signal for thermal transients, with the proviso that the disk does not have a specially formed surface for calibrating the thermal signal;
   generating first thermal variation information indicative of a relationship of thermal transients in the first thermal signal relative to a baseline; and
   comparing the first thermal variation information to threshold information indicative of an acceptable HDI.

2. The method of claim 1, wherein the first thermal variation information relates to a magnitude of thermal transients in the first thermal signal relative to the baseline.

3. The method of claim 1, wherein the first thermal variation information relates to a number of thermal transients in the first thermal signal.

4. The method of claim 1, wherein the first thermal variation information is a statistical variation of the thermal transients in the first thermal signal.

5. The method of claim 4, wherein the statistical variance is a standard deviation of the first thermal signal relative to the baseline.

6. The method of claim 1, wherein the first thermal signal is a component of a readback signal.

7. The method of claim 6, wherein the first thermal variation information is a standard deviation of the first thermal signal in volts.

8. The method of claim 1, wherein the first thermal signal is generated at any radial location of the disk surface.

9. The method of claim 1, wherein the disk is glass-based.

10. The method of claim 1, wherein the disk drive includes a plurality of disks and a plurality of transducer heads, each positioned over a surface of a respective one of the disks, the method further comprising:
   receiving thermal signals from each of the plurality of transducer heads;
   analyzing each of the thermal signals for thermal transients;
   determining a thermal transient variance value for each of the thermal signals relative to a baseline; and
   establishing a largest of the determined thermal transient variance values as the first thermal variation information.

11. The method of claim 1, further comprising:
   receiving a threshold thermal signal from the transducer head indicative of thermal activity when the HDI is known to be acceptable; and
   generating the threshold variation information as a function of variation in the threshold thermal signal relative to a baseline.

12. The method of claim 1, further comprising:
receiving a second thermal signal from the transducer head indicative of thermal activity at a time subsequent to the first thermal signal;
analyzing the second thermal signal for thermal transients;
generating second thermal variation information indicative of a relationship of thermal transients in the second thermal signal relative to a baseline; and
comparing the second thermal variation information to first thermal variation information.

13. The method of claim 1, further comprising:
predicting an impending head crash based upon the comparison of the first thermal variation information to the threshold information.

14. The method of claim 13, wherein predicting an impending head crash includes determining that the first thermal variation information differs from the threshold information by at least 20%.

15. A disk drive comprising:
at least one disk having a disk surface with the proviso that the disk does not have a specially formed surface feature for calibrating a thermal component signal;
at least one transducer head for writing and/or reading data from the disk surface, the transducer head being temperature sensitive and generating a readback signal, a component of which is indicative of thermal activity;
a spindle motor coupled to the disk for rotating the disk;
an actuator assembly coupled to the transducer head for positioning the transducer head over the disk surface; and
a programmable controller for evaluating an interface between the transducer head and the disk surface (HDI), the programmable controller capable of:
receiving the readback signal from the transducer head,
delineating a thermal component signal from the readback signal,
analyzing the thermal component signal for thermal transients,
generating thermal variation information indicative of a relationship of thermal transients in the thermal component signal relative to a baseline,
comparing the thermal variation information to threshold information indicative of an acceptable HDI,
evaluating a current status of the HDI based upon the comparison.

16. The disk drive of claim 15, wherein the disk is glass-based.

17. The disk drive of claim 15, wherein the programmable controller is further capable of predicting an impending head crash failure based upon the comparison.

18. The disk drive of claim 17, wherein the programmable controller is further capable of prompting a corrective action after predicting an impending head crash failure.

19. The disk drive of claim 15, wherein the programmable controller is further capable of establishing a reference value indicative of a statistical variance in the thermal component signal.

20. The disk drive of claim 15, wherein the programmable controller is capable of controlling the actuator assembly to position the transducer head at any radial position of the disk surface for evaluating the HDI.

* * * * *